(12) United States Patent
Neuenschwander et al.

(10) Patent No.: US 12,330,523 B2
(45) Date of Patent: Jun. 17, 2025

(54) ELECTRIC VEHICLE DISTRIBUTED ENERGY RESOURCE MANAGEMENT

(71) Applicant: Itron, Inc., Liberty Lake, WA (US)

(72) Inventors: Victoria Neuenschwander, Raleigh, NC (US); Tyler Byers, Liberty Lake, WA (US); Michael Ting, Oakland, CA (US)

(73) Assignee: Itron, Inc., Liberty Lake, WA (US)

( * ) Notice: Subject to any disclaimer, the term of this patent is extended or adjusted under 35 U.S.C. 154(b) by 570 days.

(21) Appl. No.: 17/851,565

(22) Filed: Jun. 28, 2022

(65) Prior Publication Data

US 2023/0044046 A1 Feb. 9, 2023

Related U.S. Application Data

(60) Provisional application No. 63/229,009, filed on Aug. 3, 2021.

(51) Int. Cl.
*B60L 53/62* (2019.01)
*G05B 13/04* (2006.01)
*G07C 5/00* (2006.01)
*G06Q 10/04* (2023.01)

(52) U.S. Cl.
CPC ............ *B60L 53/62* (2019.02); *G05B 13/048* (2013.01); *G07C 5/008* (2013.01)

(58) Field of Classification Search
CPC .. B60L 53/62; B60L 2240/62; B60L 2260/54; B60L 53/63; B60L 53/68; B60L 58/12; G05B 13/048; G07C 5/008; G06Q 50/40; G06Q 10/04; G06Q 30/0201; G06Q 30/0283; G06Q 50/06; Y02T 10/70; Y02T 10/7072; Y02T 90/12
USPC ......................................................... 700/295
See application file for complete search history.

(56) References Cited

U.S. PATENT DOCUMENTS

2012/0123709 A1* 5/2012 Chen ..................... B60L 53/665
702/60
2014/0358749 A1* 12/2014 Williams ............... G06Q 30/04
705/34

OTHER PUBLICATIONS

Canadian Office Action mailed Sep. 5, 2023 for Canadian Application No. 3,169,464, a foreign counterpart to U.S. Appl. No. 17/851,565, 6 pages.

* cited by examiner

*Primary Examiner* — Michael J Brown
(74) *Attorney, Agent, or Firm* — Lee & Hayes, P.C.

(57) ABSTRACT

A method and system for managing electric vehicle (EV) distributed energy resource(s) (DER) are disclosed. A DER analytics engine may receive electricity consumption data of a plurality of sites from corresponding electricity meters of the plurality of sites, detect EV charging information based at least in part on the electricity consumption data, obtain EV telematics data of EVs associated with the EV charging information, reconcile the EV charging information and the EV telematics data, and generate, based on the reconciled EV charging information and the EV telematics data, models for at least one of continuous EV load prediction, electrical vehicle supply equipment (EVSE detection), and/or optimization for at least one of aggregated load, load per feeder, or maximum revenue for time-of-use tiers.

20 Claims, 3 Drawing Sheets

ELECTRIC VEHICLE DISTRIBUTED ENERGY RESOURCE MANAGEMENT

This patent application claims benefit of priority to U.S. provisional patent application Ser. No. 63/229,009, titled "ELECTRIC VEHICLE ANALYTICS AND MANAGEMENT," filed on Aug. 3, 2021, which is incorporated herein by reference.

TECHNICAL FIELD

The present disclosure generally relates to the field of electrical load management, and more specifically to methods, apparatus, and system for monitoring loads from charging electric vehicles and providing load distribution information.

BACKGROUND

Global efforts to reduce carbon emissions from internal combustion engines are the catalyst for automobile manufacturers to set goals to produce only electric vehicles (EVs) within the next 10 to 20 years. However, swift EV adoption can have hazardous effects on the power grid in situations when the distribution infrastructure is not able to handle the substantial increase in demand.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods for managing distribution of electrical power are disclosed. Distributed energy resource (DER) control software and/or systems may be configured to manage heating, ventilation, and air conditioning (HVAC), swimming pool heaters and pumps, and other thermostatically and/or switched electrical loads in a cooperative effort with program participants and utility companies for peak load reduction and balancing. A DER program participant is any utility customer who agrees to follow EV charging rules as outlined by the utility where the DER program is approved by a US state energy regulator. A non-participant is a utility customer who is not enrolled in an EV charging program offered by the utility. The peak load reduction and balancing may be further extended to include EVs.

Load disaggregation solutions may use advanced metering infrastructure (AMI) data to determine when an EV is being charged. Charging signals associated with the EV may be utilized to provide DER optimization, such as event recommendations and/or actions. Telematics solutions associated with the EV may also additionally be utilized with the AMI data to synergistically provide DER optimization. Depending on the DER program rules, both telematics and AMI data may be used for the source on determining on and off peak charging. Such synergistic solutions may provide a direct integration to an analytics engine with a demand response management system (DRMS). Using such a platform may automate phases of demand response and energy efficiency programs, while also providing utilities a single operational view into a utility company's residential, small business, commercial and industrial demand energy management initiatives. Accordingly, the combined solution using (1) load disaggregation solutions based at least in part on AMI data, and (2) telematics solutions may be used to provide DER recommendations and/or actions, and to thereby provide control over EV charging in a manner that results in greater efficiencies and safety such as preventing overloading of grid components (e.g., transformers) and damages to the infrastructure.

Figure 1:
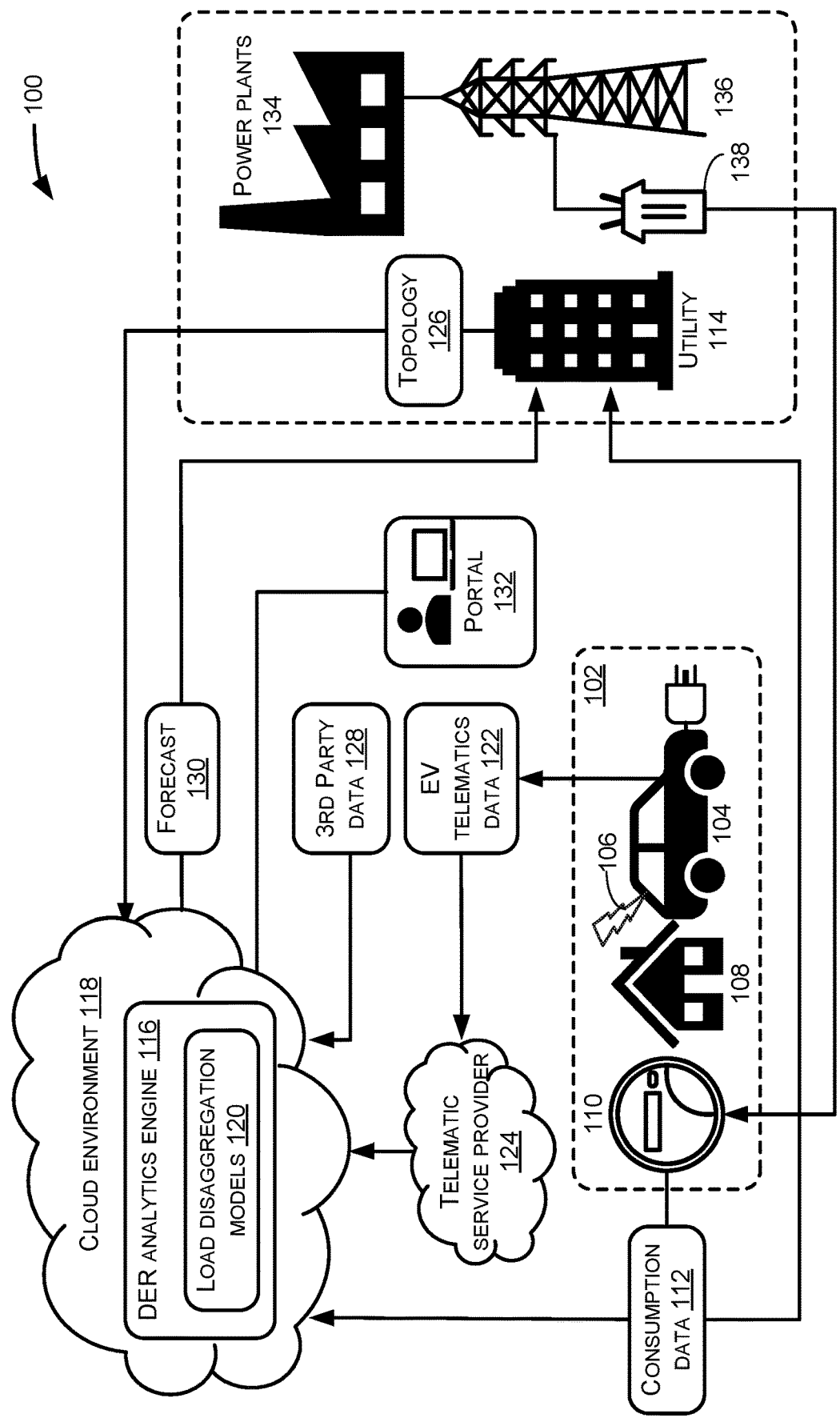
FIG. 1 illustrates an example environment in which an electric vehicle distributed energy resource management may be utilized.

FIG. 1 illustrates an example environment 100 in which electric vehicle distributed energy resource management may be utilized. The electric vehicle distributed energy resource management may use both telematics data (e.g., automotive data that may be enabled by sensors) and disaggregated AMI data to provide distributed energy resource optimization and event recommendations and/or actions. By using the telematics, the electric vehicle distributed energy resource management may obtain in-depth understanding of the operation of EVs in an area. By using the AMI, the electric vehicle distributed energy resource management may obtain in-depth understanding of electricity customers' electricity use and EV charging habits. Thus, the electric vehicle distributed energy resource management may use both telematics data and AMI data to interact synergistically with distributed energy resource (DER) control software. The electric vehicle distributed energy resource management may protect existing components from overload (e.g., transformers), distribute load more evenly (e.g., among substations, feeders, transformers, etc.) to delay capital improvement purchases, and move demand from peak to off-peak times to delay the need for additional generating facilities, among other benefits.

In an example, a DER program participant 102 may charge his or her EV 104 using electrical vehicle supply equipment (EVSE) 106 at a site 108, where a smart electricity metering device (meter) 110 associated with the site 108 may monitor, record, and/or report electricity consumption, for example in kilowatt-hour (kWh). The site 108 may include a residence, a charging station, an office/work site, and the like, associated with the DER program participant 102, and may be used interchangeably. The meter 110 may belong to an AMI and may transmit electricity consumption data 112 associated with the electricity consumption to a utility provider 114 at a regular interval, such as every 15 minutes, or on an as-needed basis, for utility billing for the DER program participant 102. The AMI data may include the electricity consumption data 112, and may also be referred to as AMI consumption data. The meter 110 may also transmit the electricity consumption data 112 to a DER analytics engine 116 hosted in a cloud environment 118 at a regular interval, such as every 15 minutes, or on an as-needed basis. The DER analytics engine 116 may be hosted by a single server or may be distributedly hosted by a plurality of servers in the cloud environment 118. The meter 110 may transmit the electricity consumption data 112 if an unusual activity, such as a higher than expected consumption, is detected, or in response to a request for the electricity consumption data 112 from the DER analytics engine 116 or from the utility provider 114. The DER analytics engine 116 may analyze electricity consumption data from all utility residential customers within a predetermined area through load disaggregation models 120 to detect residential charging of EVs and identify non-DER program participants such that these non-participants may be notified for DER program participation.

In the DER analytics engine 116, the electricity consumption data 112 may be analyzed through load disaggregation models 120 to distinguish loads from various electricity usages such as air conditioning, heating, hot water, EV charging and others, and identify the time the EV 104 is being charged and determine the amount of kWh used for charging. Consumption data, similar to the electricity consumption data 112, gathered from the smart electrical grid, may be used to identify the locations where EVs are charged.

EV telematics data 122 from the EV 104 of the DER program participant 102 may also be collected and analyzed by the DER analytics engine 116. The DER analytics engine 116 may obtain the EV telematics data 122 of the EV 104 directly from the EV 104 or from a telematics service provider, or server, 124 to which the DER program participant 102 subscribes to for telematics services for the EV 104. A telematics system may include a vehicle tracking device installed in the EV 104 and in radio communication with the telematics service provider/server 124 such as a base or office, server farm, cloud, etc. The telematics system may be configured for sending, receiving and/or storing of telemetry data. The EV telematics data 122 may include general vehicle operation information such as vehicle location, direction, speed, engine and/or drivetrain data, driver's actions, such as acceleration or braking, fuel consumption, vehicle diagnostics (e.g., tire inflation, brake wear, etc.). The EV telematics data may further include EV specific information such as a state of battery charge of the EV 104, a beginning time of a charge session, a duration of the charge session, an end time of the charge session, kWh used for the charge session, mileage at the time of the charge session, vehicle temperature at the charge session, a location of vehicle during the charging session, a vehicle identifier of the EV 104, and other parameters associated with the EV 104.

Although a participant and non-participants are distinguished in this example, in some examples, all EV users/owners may be considered as participants as they charge their EVs within the predetermined area, and consumption data, charging information, and available vehicle information may be collected as the EV is charged. The DER analytics engine 116 may then reconcile consumption data and EV telematics data from some or all of the participants. The DER analytics engine 116 may receive network topology information 126, such as feeder line information and transformers-to-meters relationships and attributes, from the utility provider 114, analyze the network topology information, and include the analyzed network topology information in the reconciliation. The DER analytics engine 116 may additionally receive third party subscription data 128, such as weather services, vehicle registration information, residential real estate data, and others, and include the third party subscription data 128 in the reconciliation. Based on the information above, the DER analytics engine 116 may generate models for (1) continuous 24-hour EV load prediction; (2) EVSE detection; (3) optimization for (A) aggregated load, (B) load per feeder, and (C) maximum revenue for time-of-use tiers, and provide a forecast 130, such as DER optimization, actions, and/or event recommendations, to the utility provider 114. In an example, a machine learning platform may be used to tune load disaggregation models 120 and/or data used by DER analytics engine 116.

The forecast 130 may be targeted for the feeder and/or transformer load level. The feeder lines provide power from an electrical substation to one or more transformers, each of which may provide power to one or more electricity customers including DER program participants. In an example, event recommendations may be set to prevent overloading at the feeder and/or transformer level.

The forecast 130 may additionally, or alternatively, be directed to operate an electrical grid to maximize one or more objectives. In an example, the grid may be operated to maximize billing revenue for the utility provider 114 under the load level constraints. In a second example, the grid may be operated to minimize the need to invest in the grid (e.g., buying more transformers) by better utilizing available infrastructure. In a third example, the grid may be operated to prevent overload of grid components (e.g., transformers) and to thereby prevent damage to the infrastructure. In additional examples, combinations of goals may be pursued such as by creating a number of constraints/objectives and applying techniques of operations research, etc.

The DER analytics engine 116 may be a demand response management system (DRAB) that provides extensive additional capabilities such as integrated modules to manage energy efficiency programs and distributed energy resources. The DER analytics engine 116 may automate phases of demand response and energy efficiency programs, while also providing utility companies with an operational view into their residential, small business and commercial and industrial demand energy management activities. The DER analytics engine 116 may also provide a user interface and/or DER customer portal 132 usable by utility provider employees. The utility provider 114 may have its own power plants 134, transmission infrastructure 136, and transformers 138.

In an example, the DER analytics engine 116, the cloud environment 118, the load disaggregation models 120, the telematics service provider/server 124, and third party subscription data 128 may be combined. That is, the software and or functionality of the tool(s), system(s), resource(s), cloud(s), platform(s), etc., discussed above may be combined in different ways depending on design requirements, ease of construction and/or integration, cost, etc. Accordingly, while these elements have been separated for purposes of discussion, they may be combined, as appropriate, during implementation.

Figure 2:
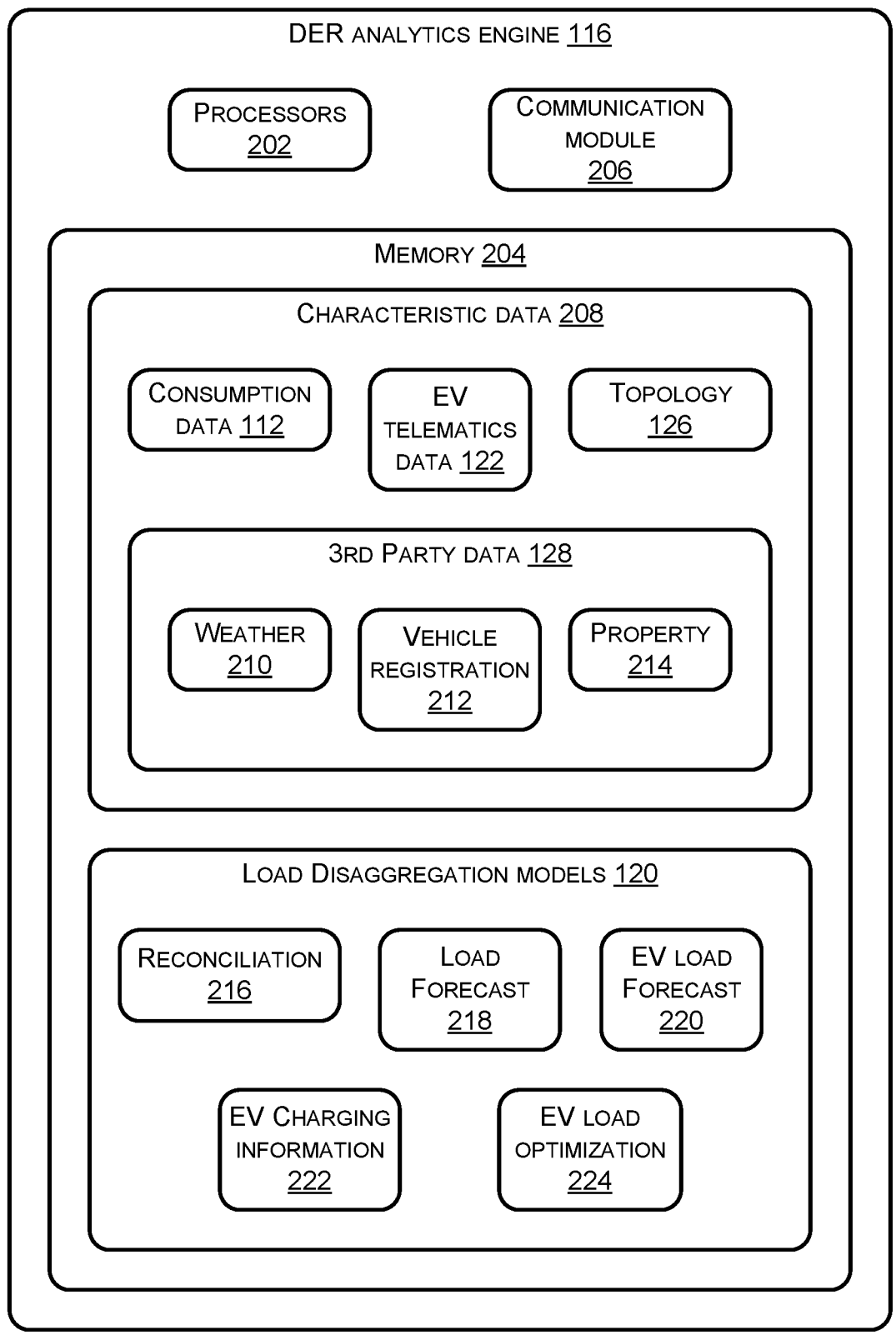
FIG. 2 illustrates example components involved in a distributed energy resource analytics engine.

FIG. 2 illustrates example components involved in the DER analytics engine 116. As described above with reference to FIG. 1, the DER analytics engine 116, and the load disaggregation models 120, may be hosted by a single server or distributedly hosted by a plurality of servers in a cloud environment, such as the cloud environment 118 may host the DER analytics engine 116.

The DER analytics engine 116 may comprise one or more processors (processors) 202, memory 204 communicatively coupled to the processors 202, and a communication module 206 communicatively coupled to the processors 202 and the memory 204. The DER analytics engine 116 may receive, or collect, via the communication module 206 and store in the memory 204, characteristic data 208 which may comprise the electricity consumption data 112, the EV telematics data 122, and the network topology information 126. The characteristic data 208 may also include the third party subscription data 128, which may comprise weather data 210 including current and historical weather data, vehicle registration data 212 associated with EVs of the participants, and property information 214 of residences of the participants.

The load disaggregation models 120 may comprise a plurality of modules and data in the memory 204, and analyze the characteristic data 208. For example, a reconciliation module 216 may perform reconciliation of the electricity consumption data 112 and the EV telematics data 122, and generate the forecast 130 as described above with reference to FIG. 1. The forecast 130 may comprise a load forecast 218 of levels at feeders and/or residential transformers, an EV specific load forecast 220 of levels at the feeders and/or residential transformers, EV charging information 222 including the parameters associated with EVs discussed above, and EV load optimization 224 for the participants at associated feeders and/or residential transformers.

Figure 3:
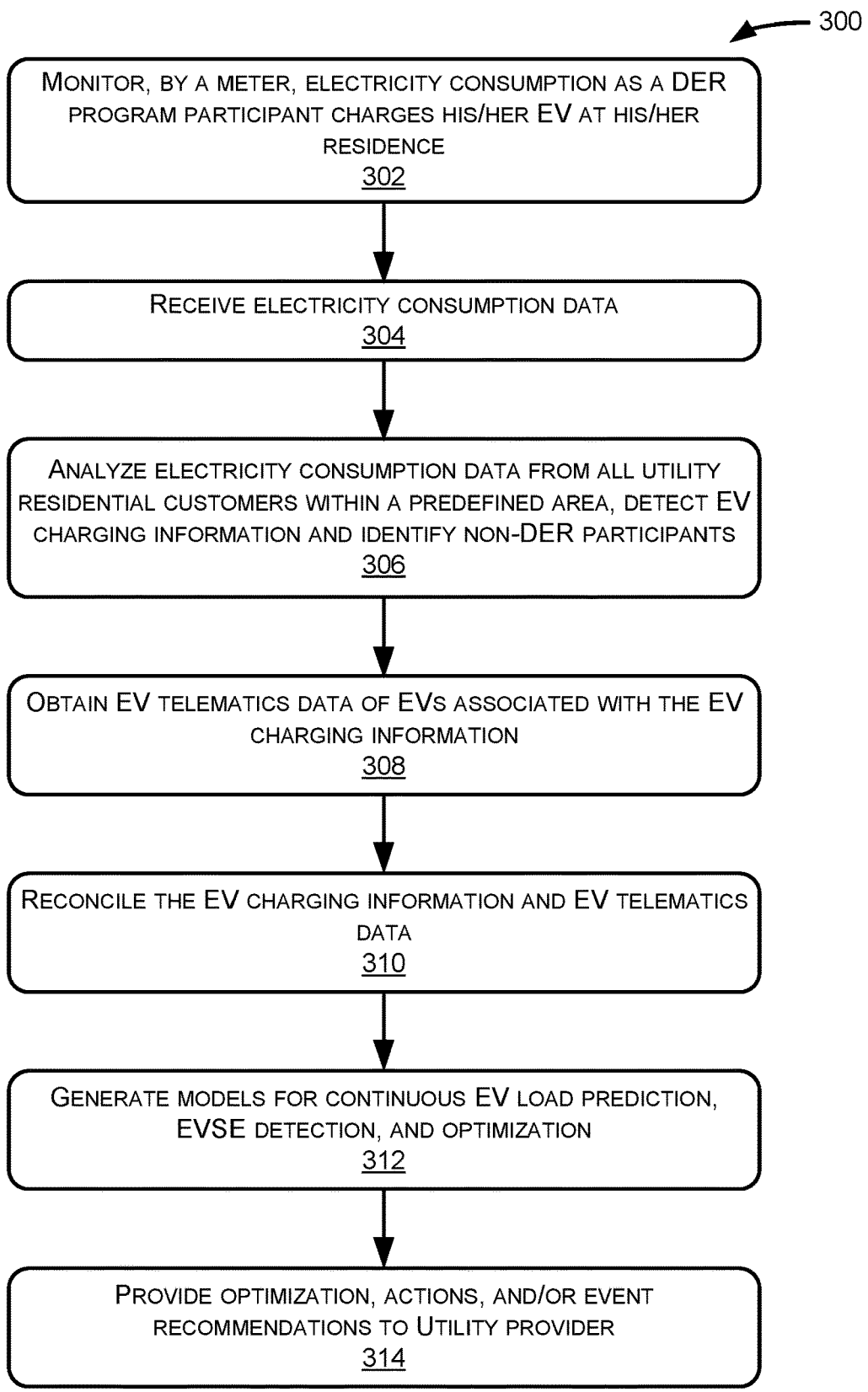
FIG. 3 illustrates an example process for electric vehicle distributed energy resource management.

FIG. 3 illustrates an example process 300 for electric vehicle distributed energy resource management. A DER analytics engine, such as the DER analytics engine 116 as discussed above with reference to FIG. 1, may receive or collect both disaggregated AMI consumption data of residences and telematics data from EVs to provide distributed energy resource optimization and event recommendations and/or actions.

At block 302, as a DER program participant, such as the DER participant 102, of a plurality of DER program participants charges his or her EV 104 at his or her residence 108 using the EVSE 106, a smart electricity metering device (meter) associated with the residence 108, such as the meter 110, may monitor, record, and/or report electricity consumption, for example in kilowatt-hour (kWh).

At block 304, the DER analytics engine 116 hosted in the cloud environment 118 may receive electricity consumption data 112 associated with the electricity consumption from the meter 110. The meter 110 may transmit the electricity consumption data 112 at a regular interval, such as every 15 minutes, or on an as-needed basis based on the electricity consumption data. For example, the meter 110 may transmit the electricity consumption data 112 if an unusual activity, such as a higher than expected consumption, is detected, or in response to a request for the electricity consumption data 112 from the DER analytics engine 116 or the utility provider 114. The DER analytics engine 116 may be hosted by a single server or may be distributedly hosted by a plurality of servers in the cloud environment 118.

At block 306, the DER analytics engine 116 may analyze electricity consumption data from all utility residential customers within a predetermined area through load disaggregation models 120 to detect residential charging of EVs and identify non-DER program participants such that these non-participants may be notified for DER program participation. The DER analytics engine 116 may further analyze the electricity consumption data from each residence through load disaggregation models 120 to distinguish loads from various electricity usages such as air conditioning, heating, hot water, EV charging and others, and identify the time the EV 104 is being charged and determine the amount of kWh used for charging. Consumption data, similar to the electricity consumption data 112, gathered from the smart electrical grid, may be used to identify the locations where EVs are charged.

At block 308, the DER analytics engine 116 may collect and analyze EV telematics data from EVs of the DER program participants. For example, the DER analytics engine 116 may collect and analyze the EV telematics data 122 from the EV 104. The DER analytics engine 116 may obtain the EV telematics data 122 of the EV 104 directly from the EV 104 or from a telematics service provider, or server, 124 to which the DER program participant 102 subscribes to for telematics services for the EV 104. A telematics system may include a vehicle tracking device installed in the EV 104 and in radio communication with the telematics service provider/server 124 such as a base or office, server farm, cloud, etc. The telematics system may be configured for sending, receiving and/or storing of telemetry data. The EV telematics data 122 may include general vehicle operation information such as vehicle location, direction, speed, engine and/or drivetrain data, driver's actions, such as acceleration or braking, fuel consumption, vehicle diagnostics (e.g., tire inflation, brake wear, etc.), etc. The EV telematics data may further include EV specific information such as a state of battery charge of the EV 104, a beginning time of a charge session, a duration of the charge session, an end time of the charge session, kWh used for the charge session, mileage at the time of the charge session, vehicle temperature at the charge session, a location of vehicle during the charging session, a vehicle identifier of the EV 104, and other parameters associated with the EV 104.

The DER analytics engine 116 may then reconcile the electricity consumption data and EV telematics data from some or all of the participants at block 310. The DER analytics engine 116 may additionally receive and analyze network topology information 126, such as feeder line information and transformers-to-meters relationships and attributes, from the utility provider 114, and third party subscription data 128, such as weather services, vehicle registration information, residential real estate data, and others, and include this information in the reconciliation.

Based on the above-described reconciled information, the DER analytics engine 116 may, at block 312, generate models for (1) continuous 24-hour EV load prediction; (2) EVSE detection; (3) optimization for (A) aggregated load, (B) load per feeder, and (C) maximum revenue for time-of-use tiers. At block 314, the DER analytics engine 116 may provide a forecast 130, such as DER optimization, actions, and/or event recommendations, to the utility provider 114. In an example, a machine learning platform may be used to tune load disaggregation models 120 and/or data used by DER analytics engine 116.

The forecast 130 may be targeted for the feeder and/or transformer load level. The feeder lines provide power from an electrical substation to one or more transformers, each of which may provide power to one or more electricity customers including DER program participants. In an example, event recommendations may be set to prevent overloading at the feeder and/or transformer level. The forecast 130 may additionally, or alternatively, be directed to operate an electrical grid to maximize one or more objectives. In an example, the grid may be operated to the maximize billing revenue for the utility provider 114 under the load level constraints. In a second example, the grid may be operated to minimize the need to invest in the grid (e.g., buying more transformers) by better utilizing available infrastructure. In a third example, the grid may be operated to prevent overload of grid components (e.g., transformers) and to thereby prevent damage to the infrastructure. In additional examples, combinations of goals may be pursued such as by creating a number of constraints/objectives and applying techniques of operations research, etc.

The DER analytics engine 116 may be a demand response management system (DRAB) that provides extensive additional capabilities such as integrated modules to manage energy efficiency programs and distributed energy resources. The DER analytics engine 116 may automate phases of demand response and energy efficiency programs, while also providing utility companies with an operational view into their residential, small business and commercial and industrial demand energy management activities. The DER analytics engine 116 may also provide a user interface and/or DER customer portal 132 usable by utility provider employees. The utility provider 114 may have its own power plants 134, transmission infrastructure 136, and transformers 138.

In an example, the DER analytics engine 116, the cloud environment 118, the load disaggregation models 120, the telematics service provider/server 124, and third party subscription data 128 may be combined. That is, the software and or functionality of the tool(s), system(s), resource(s), cloud(s), platform(s), etc., discussed above may be combined in different ways depending on design requirements, ease of construction and/or integration, cost, etc. Accordingly, while these elements have been separated for purposes of discussion, they may be combined, as appropriate, during implementation.

Some or all operations of the methods described above can be performed by execution of computer-readable instructions stored on a computer-readable storage medium, as defined below. The terms "computer-readable medium," "computer-readable instructions," and "computer executable instructions" as used in the description and claims, include routines, applications, application modules, program modules, programs, components, data structures, algorithms, and the like. Computer-readable and -executable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transitory computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by a distributed energy resource (DER) analytics engine, the method comprising:
   receiving electricity consumption data of a plurality of sites from corresponding electricity meters of the plurality of sites;
   detecting electric vehicle (EV) charging information based at least in part on the electricity consumption data;
   obtaining EV telematics data of EVs associated with the EV charging information;
   reconciling the EV charging information and the EV telematics data, the reconciling including:
      receiving network topology information including feeder line information and transformers-to-meters relationships and attributes, and
      analyzing the network topology information; and
   generating, based on the reconciled EV charging information and EV telematics data, models for at least one of:
      continuous EV load prediction,
      electrical vehicle supply equipment (EVSE) detection, and
      optimization for at least one of aggregated load, load per feeder, or maximum revenue for time-of-use tiers.

2. The method of claim 1, wherein receiving the electricity consumption data of the plurality of sites from the corresponding electricity meters of the plurality of sites includes:
   receiving the electricity consumption data from the corresponding electricity meters at a predetermined interval or on as-needed basis.

3. The method of claim 1, wherein the DER analytics engine is:
   hosted by a server, or
   distributedly hosted by a plurality of servers in a cloud environment.

4. The method of claim 1, wherein detecting the EV charging information based at least in part on the electricity consumption data includes:
   analyzing the electricity consumption data from a site of the plurality of sites through one or more load disaggregation models; and
   distinguishing EV charging loads from other electricity loads.

5. The method of claim 1, wherein the EV charging information includes at least one of:
   a time when an EV is charged,
   an amount of electricity used for charging the EV, or
   a location where the EV is charged.

6. The method of claim 5, wherein the location where the EV is charged is determined based at least in part on consumption data gathered from a smart electrical grid.

7. The method of claim 1, wherein obtaining the EV telematics data of the EVs associated with the EV charging information includes at least one of:
   receiving the EV telematics data directly from the EVs, or
   receiving the EV telematics data from a telematics service provider to which DER program participants subscribe for telematics services for the EVs.

8. The method of claim 1, wherein the EV telematics data includes general vehicle operation information and EV specific information.

9. The method of claim 1, wherein reconciling the EV charging information and the EV telematics data further includes:
   receiving third party subscription data; and
   including the analyzed network topology information and the third party subscription data in the reconciling.

10. The method of claim 1, further comprising:
    providing a forecast to a utility provider associated with the plurality of sites, the forecast including at least one of DER optimization, actions, or event recommendations.

11. The method of claim 10, wherein the forecast is targeted for at least one of:
    a feeder load level to prevent overloading at a feeder level, or
    a transformer load level to prevent overloading at a transformer level.

12. A distributed energy resource (DER) analytics engine comprising:
    one or more processors; and
    memory communicatively coupled to the one or more processors, the memory storing thereon computer executable instructions that, when executed by the one or more processors, cause the one or more processors to perform operations comprising:
    receiving electricity consumption data of a plurality of sites from corresponding electricity meters of the plurality of sites;
    detecting electric vehicle (EV) charging information based at least in part on the electricity consumption data;
    obtaining EV telematics data of EVs associated with the EV charging information;
    reconciling the EV charging information and the EV telematics data, the reconciling including:
      receiving network topology information including feeder line information and transformers-to-meters relationships and attributes, and
      analyzing the network topology information; and
    generating, based on the reconciled EV charging information and EV telematics data, models for at least one of:
      continuous EV load prediction,
      electrical vehicle supply equipment (EVSE) detection, and
      optimization for at least one of aggregated load, load per feeder, or maximum revenue for time-of-use tiers.

13. The DER analytics engine of claim 12, wherein detecting the EV charging information based at least in part on the electricity consumption data includes:
    analyzing the electricity consumption data from a site of the plurality of sites through load disaggregation models; and
    distinguishing EV charging loads from other electricity loads.

14. The DER analytics engine of claim 12, wherein obtaining the EV telematics data of the EVs associated with the EV charging information includes at least one of:
    receiving the EV telematics data directly from the EVs, or
    receiving the EV telematics data from a telematics service provider to which DER program participants subscribe to for telematics services for the EVs.

15. The DER analytics engine of claim 12, wherein reconciling the EV charging information and the EV telematics data further includes:
    receiving third party subscription data; and
    including the analyzed network topology information and the third party subscription data in the reconciling.

16. The DER analytics engine of claim 12, wherein the operations further comprise:
    providing a forecast to a utility provider associated with the plurality of sites, the forecast including at least one of DER optimization, actions, or event recommendations.

17. A non-transitory computer-readable storage medium storing thereon computer executable instructions that, when executed by one or more processors, cause the one or more processors to perform operations comprising:
    receiving electricity consumption data of a plurality of sites from corresponding electricity meters of the plurality of sites;
    detecting electric vehicle (EV) charging information based at least in part on the electricity consumption data;
    obtaining EV telematics data of EVs associated with the EV charging information;
    reconciling the EV charging information and the EV telematics data, the reconciling including:
      receiving network topology information including feeder line information and transformers-to-meters relationships and attributes, and
      analyzing the network topology information; and
    generating, based on the reconciled EV charging information and EV telematics data, models for at least one of:
      continuous EV load prediction,
      electrical vehicle supply equipment (EVSE) detection, and
      optimization for at least one of aggregated load, load per feeder, or maximum revenue for time-of-use tiers.

18. The non-transitory computer-readable storage medium of claim 17, wherein detecting the EV charging information based at least in part on the electricity consumption data includes:
    analyzing the electricity consumption data from a site of the plurality of sites through load disaggregation models; and
    distinguishing EV charging loads from other electricity loads.

19. The non-transitory computer-readable storage medium of claim 17, wherein reconciling the EV charging information and the EV telematics data includes:
    receiving third party subscription data; and including the analyzed network topology information and the third party subscription data in the reconciling.

20. The non-transitory computer-readable storage medium of claim 17, wherein the operations further comprise:
providing a forecast to a utility provider for the plurality of sites, the forecast including at least one of DER optimization, actions, or event recommendations.

* * * * *